Jan. 15, 1957 R. LARSON ET AL 2,777,541

PHONOGRAPH BRAKE MECHANISM

Filed March 18, 1953

INVENTORS.
Robert Larson
& Robert Shoemaker
By: Robert L Kahn
Atty.

United States Patent Office 2,777,541

Patented Jan. 15, 1957

2,777,541

PHONOGRAPH BRAKE MECHANISM

Robert Larson, Batavia, and Robert Shoemaker, St. Charles, Ill., assignors to Du Kane Corporation, a corporation of Illinois Application March 18, 1953, Serial No. 343,182

5 Claims. (Cl. 188—74)

This invention relates to a phonograph and particularly to a brake mechanism for a phonograph. While the invention is applicable to all kinds and sizes of phonographs, it is particularly useful for small portable phonographs for strip film projectors.

The combination of a strip film projector and a phonograph, particularly of the type having a disc record is well known and widely used. Such strip film sound systems are used for a variety of purposes, such as lectures, educational purposes and the like. While the sound record accompanying a strip film is generally complete and requires no interjected comments from an operator, it happens that it may be desirable for record reproduction to be interrupted temporarily. Thus for example, when strip film sound systems are used in schools, it is desirable to temporarily stop sound reproduction while the teacher or operator of the projector gives some added explanation of a particular frame being projected.

Conventional phonographic equipment while frequently provided with brakes, nevertheless, is not adapted for convenient stoppage of the record except at the end of the record. This is particularly true in small size portable phonographs where the turntable diameter is substantially smaller than the diameter of the records used in connection therewith.

This invention provides a construction which is simple and which may be added to any phonograph for effecting braking on the edge of a disc record. The construction embodying the present invention is simple, foolproof and is quickly and simply adjustable to fit any size record. The invention has other advantages all of which will become apparent in connection with the description thereof. In the drawings, an exemplary embodiment of the invention is illustrated, it being understood however, that variations thereof may be made without departure from the scope of the invention.

Figures 1, 2:
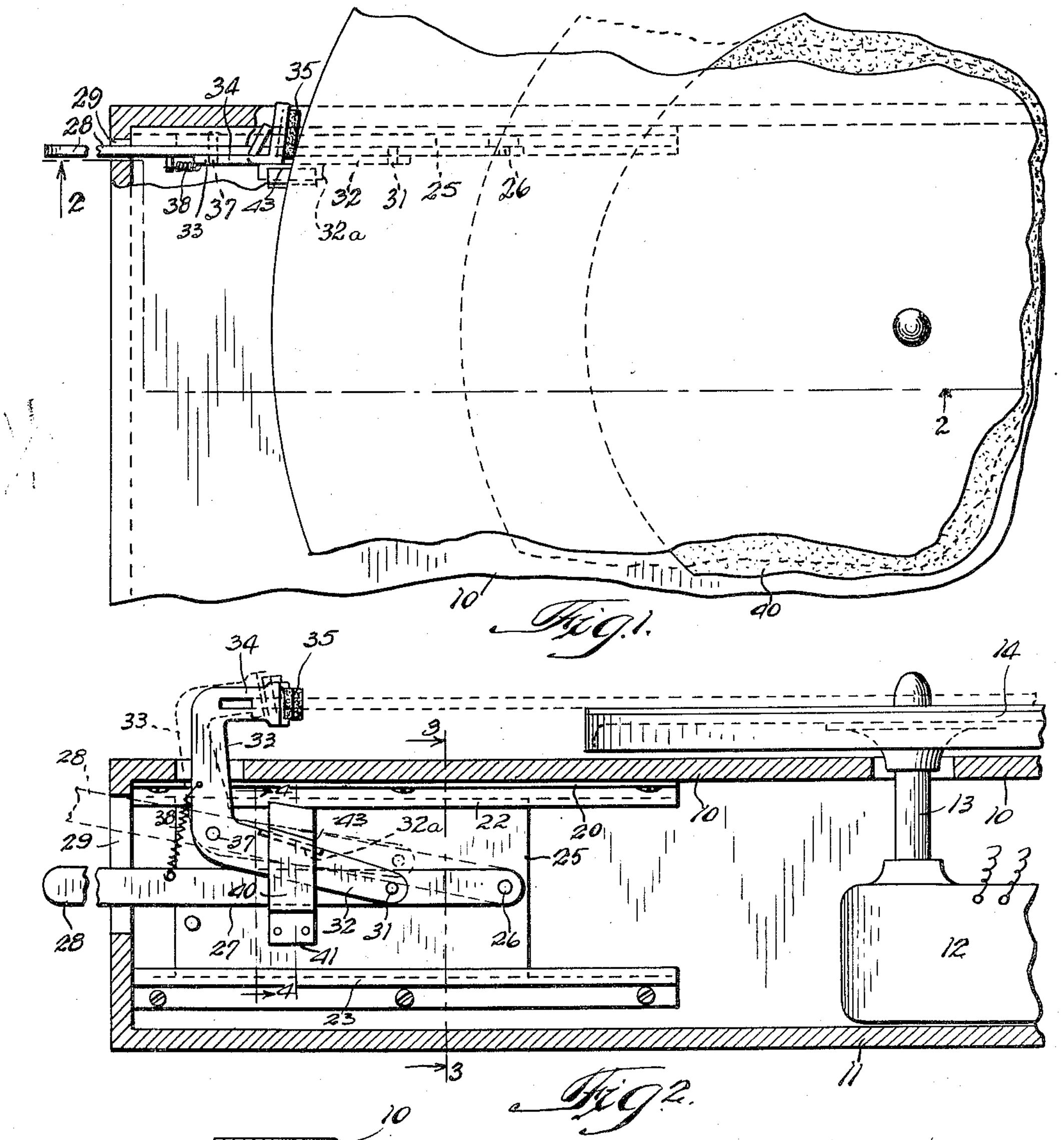
Figure 1 is a plan view of a portion of a phonograph provided with the novel brake mechanism.
Figure 2 is a sectional elevation on line 2—2 of Figure 1, the dotted lines showing the various adjusted positions of the brake and also showing the brake in active and inactive positions.
Figure 3:
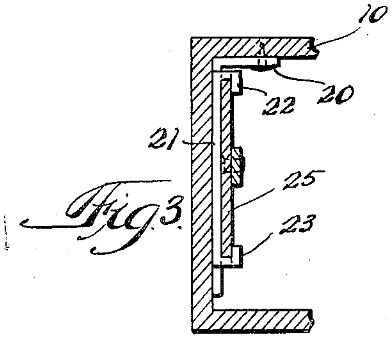
Figure 3 is a sectional detail on line 3—3 of Figure 2.

The phonograph comprises motor board 10 which may be the top part of a cabinet having base 11. Suitably supported below the motor board is motor 12 having spindle 13 and phonograph turntable 14. The phonograph motor and spindle may be any one of a number of different types and may be of the type having two or three different record speeds. In general, however, the phonograph and turntable are conventional. While the drive is here shown as extending from the motor to the spindle and then to the center of the turntable, other turntables having a rubber roller drive between the motor and the rim of the turntable may also be used.

Supported below motor board 10 is bracket 20 carrying sheet metal support 21 having top and bottom flanges or tracks 22 and 23, respectively. Support 21 and tracks 22 and 23 extend generally along a line parallel to a radius of the turntable but laterally off-set thereto, as illustrated in Figure 1. The runner and guides extend for a substantial distance both inwardly and outwardly from a point defined by the edge of any size record which may be used upon the phonograph turntable.

Slidably disposed in tracks 22 and 23 is plate 25 consisting of metal or of nonmetallic material, such as plastic or the like. Plate 25 is generally rectangular in shape and has a length which may vary within wide limits. Plate 25 has a pivot 26 upon which is secured lever 27 having finger portion 28 extending through a suitable opening 29 in the cabinet so as to be available to an operator. Lever 27 is preferably flat and is movable in a vertical plane in the normal position of the phonograph.

Carried by lever 27 is pin 31 to which is pivotally secured bell-crank brake arm 32. Brake arm 32 has vertically extending portion 33 and brake portion 34 at the end of which there is supported brake pad 35. Pad 35 may be of rubber, leather or other resilient material and may be cemented or otherwise secured to brake portion 34.

Brake arm 32 is pivotally secured at 37 to plate 25. Coil spring 38 extends between vertical portion 33 of the brake arm and lever 27, the spring tending to pull the brake arm counterclockwise or away from an active braking position. When finger 28 of lever 27 is moved upwardly to a dotted line position, the action of pivot 31 of the brake arm is such as to rock the bell-crank in an anti-clockwise direction, as seen in Figure 2, and thus move brake pad 35 toward the left or away from the record. Conversely, movement of finger 28 of the lever down, as seen in Figure 2, causes the bell-crank brake arm to rock the brake pad toward the rim of a record. Normally, lever 27 and brake arm 32 will be in the dotted line position as shown in Figure 2 so that the brake pad does not engage a record edge.

Figure 4:
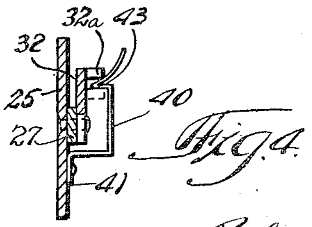
Figure 4 is a sectional detail on line 4—4 of Figure 2.

Brake arm 32 is provided at a portion of the top edge thereof with shoulder **32*a* extending laterally away from plate 25. Plate 25 carries flat strip spring 40 attached to plate 25 at mounting portion 41 of the spring. Spring 40 is shaped as illustrated in Figure 4 so that it extends away from plate 25 and then upwardly parallel to plate 25. Spring 40 has hook or detent portion 43 extending inwardly toward plate 25, this detent portion being adapted to cooperate with shoulder 32*a*. Shoulder 32*a* is adapted to be above or below detent 43 depending upon whether the brake is respectively in the off or on position. This movement of shoulder 32*a* from one side to the other side of detent 43 is controlled by finger piece 28. As illustrated in Figure 2, in the full line position when the brake is on, shoulder 32*a* will be below detent 43. In the dotted line position as shown in Figure 2, finger piece 28 is raised, the brake is off and shoulder 32*a* is above detent 43. The action of spring 40 will lock the brake arm 32** in either on or off position.

The brake structure may be adjusted for different record sizes by setting the brake arm 32 in full line position with finger piece 28 pressed down to the position shown in Figure 2. In this position, plate 25 is moved in toward the record until brake pad 35 engages the record edge. Then finger 28 and lever 27 is raised to the dotted line position causing shoulder **32*a* to move past detent 43 so that shoulder 32*a* is above detent 43. This results in release of the brake. Plate 25 has enough friction in tracks 22 and 23 so that plate 25** will remain in any desired set position.

It has been found that more desirable braking action is secured by having brake pad 35 arranged at a slant so that one side of the pad engages the record edge.

Preferably the leading side of the pad is used. It has been found that this arrangement is superior to a position where the brake pad is symmetrical with the edge of the record. Additionally, the lateral offset of the brake construction from the radial line of the turntable is also desirable. The resulting action on rim of the record is smooth and quick. The release is also effective, the record starting and stopping with a minimum of noise. Needle jumping is also eliminated.

What is claimed is:

1. A brake construction for a disc record phonograph having a turntable upon which a disc record rests during normal playing position with the record edge overlying the turntable edge, said construction comprising a flat support member disposed in a generally vertical plane, said support member having a pair of flanged tracks along the top and bottom edges thereof, said tracks extending horizontally and below the plane of the disc record, a flat plate having edge portions cooperating with the flanged edges, the flanged edges and edge portions of the plate providing sufficient friction to maintain said plate in adjusted position on said member, said plate being adjustable toward or away from the record, an arm pivotally secured upon said plate, a brake pad disposed on the free end of said arm so that said arm when moved on its pivot on the plate will cause said brake pad to move toward or away from the edge of the disc record for an adjusted plate position, said plate being adjustable to a position where the brake pad can be moved into record edge engaging position upon proper movement of said arm, spring means for biasing said arm to a position where the brake pad is furthest from any edge of the record, and means for restraining said arm against its spring bias so that the brake pad is in its closest position.

2. The construction according to claim 1 wherein said arm comprises a bell crank arm with the pivot at the bend of the arm and wherein means are provided for moving said arm, said last named means comprising a lever having one part pivotally secured to said plate and another part pivotally secured to said bell crank arm at the remaining free end of said bell crank arm, said lever having a free end for manual control.

3. The construction according to claim 2 wherein said spring means for biasing the bell crank arm comprises a spring extending between one part of the bell crank arm and a part of the pivotally secured lever.

4. The construction according to claim 3 wherein the means for restraining said arm against its spring bias comprises a spring clip carried by said plate and cooperating with said pivotally secured arm for maintaining said arm in a position where the brake pad is locked in a braking position.

5. The construction according to claim 4 wherein the brake pad is secured so that the plane of the brake pad is so inclined to the plane of the record that the leading edge of the brake pad engages the record.

References Cited in the file of this patent

UNITED STATES PATENTS

| | | |
|---|---|---|
| 1,072,123 | Jones | Sept. 2, 1913 |
| 1,724,265 | Ekholm | Aug. 13, 1929 |

FOREIGN PATENTS

| | | |
|---|---|---|
| 6,612 | Great Britain | Mar. 16, 1914 |
| 280,508 | Germany | Nov. 16, 1914 |
| 450,657 | Germany | Oct. 13, 1927 |